United States Patent Office 2,788,357
Patented Apr. 9, 1957

2,788,357
METHOD OF PREPARING PHENYLHALOSILANES

Arthur J. Barry, Midland, Mich., assignor to Dow Corning Corporation, Midland, Mich., a corporation of Michigan No Drawing. Application February 27, 1953,
Serial No. 339,478

6 Claims. (Cl. 260—448.2)

This invention relates to the preparation of phenylhalosilanes.

The primary commercial method of preparing phenylhalosilanes is that of reacting benzene with a halosilane. This general method has two main variations. One involves the reaction of benzene with a silane having at least one silicon bonded hydrogen. The other pertains to the reaction of benzene with a halosilane having no hydrogen bonded to the silicon. The latter reaction is carried out in the presence of a hydrogen halide acceptor. Hydrogen is evolved in both variations of the method. The applicant has discovered a way to improve the yields of the desired phenylhalosilanes in the above process.

It is the object of this invention to provide an improved method of preparing phenylhalosilanes by the reaction of benzene with a halosilane.

In accordance with this invention, benzene is reacted with a halosilane of the formula $R_nH_mSiX_{4-(n+m)}$, where R is an alkyl or phenyl radical, $n$ is an integer from 0 to 2 inclusive, $m$ is an integer from 0 to 3 inclusive, the sum of $n+m$ is not greater than 3 and X is a halogen having an atomic weight less than 90, at a temperature from 150° C. to 550° C. under superatmospheric pressure, with the removal of hydrogen during the reaction.

It has been found that when hydrogen is released from the system during the above reaction, substantially improved yields of the desired phenylhalosilanes are obtained. The hydrogen is preferably removed as it is formed although it may be removed intermittently if desired. The hydrogen may be removed from the reaction zone in any convenient manner. One method is that of cooling the apparatus to room temperature, releasing the hydrogen and again heating the apparatus to reaction temperatures. Alternatively, release of the hydrogen may be accomplished by means of a disk of a suitable metal such as palladium, platinum and iron, which will allow the hydrogen to diffuse but will retain the other reaction materials. Another method is that in which the hydrogen is segregated by suitable means, such as in a cool portion of the apparatus, and thereafter released by some instrument such as a thermal or density regulated valve. The latter two methods are particularly adaptable to the continuous preparation of phenylhalosilanes on a commercial scale.

Halosilanes which are operative in this invention all have at least one halogen atom having an atomic weight less than 90 (i. e. fluorine, chlorine and bromine) per silicon atom. Thus, specific examples of halosilanes which are within the scope of this invention are halosilanes of the formula $R_nSiX_{4-n}$, where $n$ is as above defined, such as $SiCl_4$, $SiBr_4$, $SiFCl_3$, $SiCl$, $Br_3$, phenyltrichlorosilane, dimethyldichlorosilane, octadecyltrichlorosilane, methylfluorodichlorosilane; and silanes of the formula $$R_nH_mSiX_{4-(n+m)}$$

where $m$ has a value from 1 to 3 inclusive and $n$ is as above defined, such as tribromosilane, dichlorosilane, fluorodichlorosilane, methyldichlorosilane, methylphenylchlorosilane, monochlorosilane, dimethylchlorosilane, octadecyldichlorosilane, methylmonochlorosilane

and phenyldichlorosilane.

The present reaction is operative at temperatures from 150° C. to 550° C. The optimum operating temperatures vary somewhat depending upon the silane reactant and whether or not catalysts are employed. When the silane reactant contains silicon bonded hydrogen, the preferred temperature range is from 150° C. to 300° C. in the presence of a catalyst and from 300° C. to 550° C. in the absence of a catalyst. When the halosilane reactant contains no silicon bonded hydrogen the preferred temperature range is from 275° C. to 400° C. when a catalyst is employed, and from 400° C. to 550° C. in the absence of a catalyst.

The preferred catalysts for use in the present invention are boron halides such as $BCl_3$ or $BF_3$ and aluminum halides such as $AlCl_3$ and $AlBr_3$. These catalysts are usually employed in amount of from about .1 to about 15 mol percent of the total reactants.

In order to obtain commercially feasible yields of phenylhalosilanes, the reaction between benzene and halosilanes of the formula $R_nSiX_{4-n}$ is carried out in the presence of a hydrogen halide acceptor. Suitable hydrogen halide acceptors are silicon and metals which appear above hydrogen in the electromotive series of metals. Such metals include iron, zinc, tin and aluminum. The hydrogen halide acceptor may be employed in any amount although it is preferred that there be at least one equivalent weight of acceptor per equivalent weight of HCl evolved during the reaction.

Hydrogen halide acceptors are not needed to obtain commercially feasible yields of phenylhalosilanes when the reactants are benzene and silanes containing silicon bonded hydrogen. However, the presence of such an acceptor does not interfere with the reaction and at times may be beneficial.

The reaction of this invention should be carried out at superatmospheric pressure. The precise pressure is not critical although generally the reaction pressures will range from 400 p. s. i. to above 1500 p. s. i.

Phenylated silanes which are produced by the method of this invention include such materials as monophenyldihalosilanes, monophenyltrihalosilanes, phenylmethyldihalosilanes, diphenyldihalosilanes and phenylhalosilanes which have phenylene links between the silicon atoms. The yield of any one of the above products varies depending upon the reaction conditions. However, it has been found that the total yield of the phenylated silanes is always improved by removing the hydrogen during the reaction. Inasmuch as all of the above phenylated products are useful in the preparation of the well-known silicone products this overall improvement in yield is of great commercial value.

The following examples are illustrative only and they are not to be construed as limiting the invention which is properly delineated in the appended claims.

EXAMPLE 1

In each run shown in Table I below, 5 mols of benzene, 5 mols of trichlorosilane and 11 g. of $BCl_3$ were heated in a bomb at 275° C. In the table the reaction was carried out for the time indicated and in runs 1, 2 and 3, the hydrogen was vented as shown. The hydrogen was vented by cooling the bomb to room temperature and releasing hydrogen. The bomb was then reheated to 275° C. and the reaction continued. The pressure during each of the runs varied from about 500 p. s. i. to about 1500 p. s. i. The pressure at 275° C. decreased after each venting of hydrogen. The residue shown in

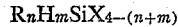

each run includes all materials boiling above phenyltrichlorosilane. These materials are diphenyldichlorosilane and polymeric materials having phenylene links between silicon atoms.

*Table I*

| Run | Total time of run in hours | Time in hrs. at which hydrogen was vented | Percent by wt. C₆H₅SiCl₃ | Percent by wt. residue | Percent by weight total phenylated chlorosilanes |
|---|---|---|---|---|---|
| 1 | 12 | 3, 6, 9 | 55.6 | 17.2 | 72.8 |
| 2 | 15 | 6, 9, 12 | 47.1 | 13 | 60.1 |
| 3 | 12 | 6 | 33.5 | 18.5 | 52 |
| 4 | 12 | None | 37.2 | 10.4 | 47.6 |

In the above runs the percent by weight of the phenylated chlorosilanes are all based on the weight of the entire reaction product (i. e. all of the material remaining in the bomb at the completion of the run). Run 4 is included for comparison.

EXAMPLE 2

468 g. of benzene, 690 g. of methyldichlorosilane and 12 g. of BCl₃ were heated in a bomb for a total of 8 hours at 205° C. at a pressure from 400 p. s. i. to 900 p. s. i. During the heating, hydrogen was vented after the second, fourth and sixth hours of the run. The venting was accomplished as shown in Example 1. The yield of phenylmethyldichlorosilane was 34.9 percent by weight of the reaction product and the phenylated residue was 7.3 percent by weight thereof making the total yield of phenylsilanes 42.2 percent.

An identical run with exception that the hydrogen was not vented during the reaction gave a yield of 25.3 percent phenylmethyldichlorosilane, 9.1 percent residue making a total yield of 34.4 percent by weight all based on the weight of the reaction product.

EXAMPLE 3

234 g. of benzene and 407 g. of trichlorosilane were mixed and heated for 12 hours at a pressure of from 875 p. s. i. to 1595 p. s. i. at 425° C. Hydrogen was vented as in Example 1 after the second, fourth and sixth hours of operation. There was obtained 3.5 percent by weight phenyldichlorosilane, 32.9 percent by weight phenyltrichlorosilane and 22.4 percent of higher boiling phenylchlorosilanes. The total yield of phenylchlorosilanes amounted to 58.8 percent by weight based on the weight of the reaction product. An identical run with the exception that the hydrogen was not vented gave 4.5 percent phenyldichlorosilane, 32 percent phenyltrichlorosilane and 10.3 percent higher boiling phenylchlorosilanes having a total yield of 46.8 percent based on the weight of the reaction product.

EXAMPLE 4

3 mols of silicon tetrachloride, 3 mols of benzene, 40 mols of powdered silicon and .056 mol of aluminum chloride were heated in a bomb at 350° C. and at a maximum pressure of 1135 p. s. i. for a total of 115 hours. When hydrogen is continuously vented from the bomb during the reaction, a higher yield of phenylchlorosilanes is obtained than is obtained in an identical run in which the hydrogen was not vented.

EXAMPLE 5

3 mols of silicon tetrachloride, 3 mols of benzene and 45.1 mols of powdered silicon were heated together in a bomb for 18 hours at 450° C. and at a maximum pressure of 1900 p. s. i. An improved yield of phenylchlorosilanes is obtained in this run when hydrogen is vented every 3 hours than is obtained when the hydrogen is not vented.

That which is claimed is:

1. A method of preparing phenylhalosilanes which comprises reacting benzene with a halosilane of the formula $R_nH_mSiX_{4-(n+m)}$, where R is of the group consisting of alkyl and phenyl radicals, X is a halogen atom having an atomic weight less than 90, n is an integer from 0 to 2 inclusive, m is an integer from 0 to 3 inclusive and the sum of $n+m$ is not greater than 3, at temperatures of from 150° C. to 550° C. in the presence of a hydrogen halide acceptor, with the removal of hydrogen only, from the reaction zone during the reaction.

2. A process of producing a phenylchlorosilane which comprises reacting benzene with trichlorosilane, at a temperature of from 150° C. to 550° C. with the removal of hydrogen only, from the reaction zone during the reaction.

3. A process of producing a phenylchlorosilane which comprises reacting benzene with methyldichlorosilane at a temperature of from 150° C. to 550° C. with the removal of hydrogen only, from the reaction zone during the reaction.

4. A process of producing a phenylchlorosilane which comprises reacting benzene with trichlorosilane at a temperature of from 150° C. to 300° C. in the presence of a catalyst of the group consisting of boron halides and aluminum halides, with the removal of hydrogen only, from the reaction zone during the reaction.

5. A process of producing a phenylchlorosilane which comprises reacting benzene with methyldichlorosilane at a temperature of from 150° C. to 300° C. in the presence of a catalyst of the group consisting of boron halides and aluminum halides, with the removal of hydrogen only, from the reaction zone during the reaction.

6. A method of preparing phenylchlorosilanes which comprises reacting benzene, silicon tetrachloride, and a hydrogen halide acceptor of the group consisting of silicon and metals appearing above hydrogen in the electromotive series of metals, in the presence of a catalyst selected from the group consisting of boron halides and aluminum halides, at a temperature of from 150° C. to 550° C., with the removal of hydrogen only, from the reaction zone during the reaction.

References Cited in the file of this patent

UNITED STATES PATENTS

| | | |
|---|---|---|
| 2,546,330 | Barry | Mar. 27, 1951 |
| 2,572,302 | Barry | Oct. 23, 1951 |
| 2,576,448 | Daudt | Nov. 27, 1951 |
| 2,591,668 | Barry et al. | Apr. 8, 1952 |
| 2,600,198 | Brewer | June 10, 1952 |
| 2,627,451 | Erickson et al. | Feb. 3, 1953 |